United States Patent

Ernst

[15] 3,646,577
[45] Feb. 29, 1972

[54] TEMPERATURE-CONTROLLED SOLDERING TOOL

[72] Inventor: Frank Ernst, Largo, Fla.

[73] Assignee: National Cash Register Company, Dayton, Ohio

[22] Filed: Mar. 30, 1970

[21] Appl. No.: 23,920

Related U.S. Application Data

[63] Continuation-in-part of Ser. No. 797,044, Feb. 6, 1969, abandoned.

[52] U.S. Cl..............................219/241, 219/238, 219/499, 219/501, 219/505, 228/51
[51] Int. Cl.........................................H05b 1/02, B23k 3/02
[58] Field of Search..............................219/221–242, 501, 219/499, 504, 505, 516; 228/51–53

[56] References Cited

UNITED STATES PATENTS

| 915,974 | 3/1909 | Leonard | 219/241 UX |
|---|---|---|---|
| 2,159,869 | 5/1939 | Thomas et al. | 219/241 |
| 2,951,927 | 9/1960 | Weller | 219/241 |
| 3,188,448 | 6/1965 | Weller | 219/241 |
| 3,256,734 | 6/1966 | Storke | 219/241 X |
| 3,287,541 | 11/1966 | Weller et al. | 219/241 |
| 3,299,345 | 1/1967 | Werts | 219/241 UX |
| 3,369,108 | 2/1968 | Strachan | 219/501 |
| 3,373,262 | 3/1968 | Howell | 219/241 UX |
| 3,393,856 | 7/1968 | Fortune | 219/241 UX |
| 3,456,095 | 7/1969 | Fox | 219/241 UX |

FOREIGN PATENTS OR APPLICATIONS

| 930,351 | 8/1947 | France | 219/241 |
|---|---|---|---|
| 588,216 | 5/1947 | Great Britain | 219/241 |

*Primary Examiner*—A. Bartis
*Attorney*—Sandoe, Hopgood and Calimafde

[57] ABSTRACT

A temperature-controlled soldering iron with replaceable tip is described wherein a fast and accurate tip-temperature control is obtained both during no-load and load conditions. A temperature-sensing element is employed which is mounted to a heat-insulative handle and so placed relative to the tip and a heating element that the tip temperature is properly sensed, with rapid tracking fidelity; the rapid response is attributed to high-thermal resistance between the mounting of the temperature-sensing element and of the heating element, compared to low-thermal resistance (effectively thermal short circuit relation) in the path from the heating element to the sensing element via inserted part of the tip. A voltage source is used which exceeds the maximum voltage rating of the heater element by a preselected amount to obtain, in cooperation with a temperature-control circuit, a temperature-regulated soldering iron which quickly responds to load variations.

13 Claims, 2 Drawing Figures

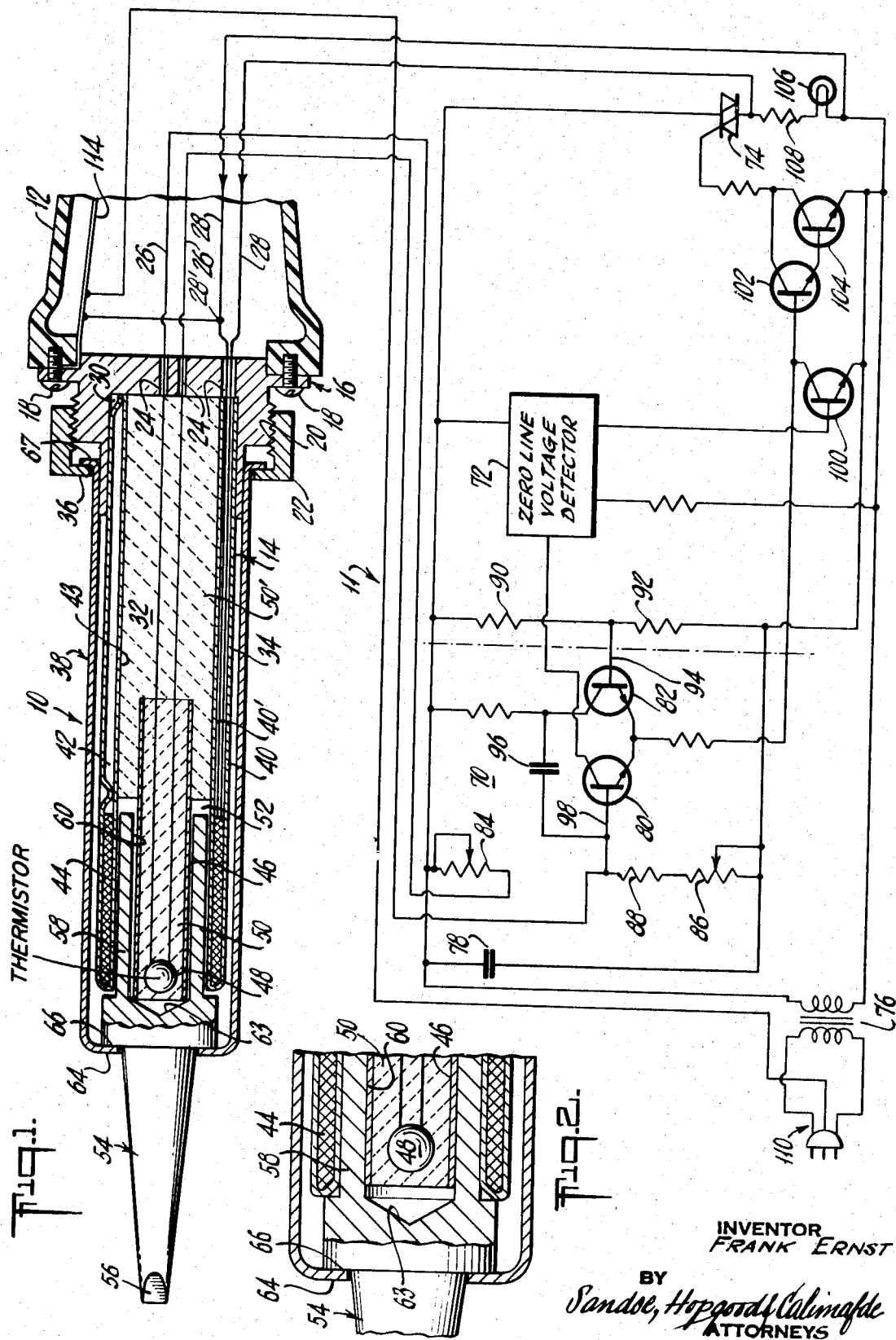

TEMPERATURE-CONTROLLED SOLDERING TOOL

This application is a continuation-in-part of my copending application, Ser. No. 797,044, filed Feb. 6, 1969, and now abandoned.

This invention relates to a temperature-regulated soldering iron.

In the use of soldering irons, a common problem encountered is the high rise in temperature of the soldering tip when the iron is not in use and the fast and large temperature drop of the tip of the iron when it is applied to a load. It is not uncommon for the tip of a soldering iron to reach 1,000° F. when not in use. Such high temperature is likely to cause damage to semiconductor components and special care must be taken to avoid high soldering-tip temperatures. For this reason, prior art soldering irons implement a temperature control to the iron to limit the tip temperature thereof to a desired value when not in use. Such temperature-regulated soldering irons require the placement of a temperature-sensing element in the vicinity of the tip. However, when such prior art temperature-controlled irons are applied to a heat-sink load such as a solder terminal, the tip of the iron rapidly drops by several hundreds of degrees Fahrenheit. The drop in temperature is even encountered when the iron is initially at a temperature within a desired range for soldering. If the iron drops below a proper soldering temperature, the solder joints tend to be unreliable.

Generally, the drop in temperature of the iron may be attributed to an inadequate capability of the power supply to provide needed power to hold the iron at a proper temperature as well as the failure of the temperature control to rapidly respond to tip-temperature variations.

The failure of prior art temperature-regulated soldering irons to properly regulate under no-load and load conditions is further the result of a poor locating of the temperature-sensing element. Generally, one may find that the temperature-sensor element is located too far from the tip and too close to the heating element, therefore tending to regulate the temperature of the heating element rather than the tip.

A further disadvantage in prior art temperature-regulated soldering irons is that the temperature-sensing element is mounted to the tip. As a result, the tip is not easily replaced and must be permanently attached as an integral unit of the soldering iron.

It is therefor an object of this invention to provide a temperature-controlled soldering iron wherein the soldering tip during load and no-load conditions is maintained within a desired temperature range.

It is further an object of this invention to provide a soldering iron which is temperature-controlled and responds quickly and accurately to varying soldering-load conditions.

It is a still further object of this invention to provide a temperature-regulated soldering iron wherein the soldering tip may be easily and conveniently replaced.

The above-mentioned and other features and objects of this invention and the manner of attaining them will become more apparent and the invention itself will best be understood by reference to the following description of an embodiment of the invention, taken in conjunction with the accompanying drawings.

Briefly stated, this invention contemplates employing a soldering iron wherein an insulated handle is provided and to which a temperature-sensing element is mounted. A tubular heating element is employed and is also attached to the handle. The soldering-iron tip has a heat-conducting shoulder or element which fits slidably within a bore of the heating element in close proximity thereto. The temperature-sensing element fits within a bore of the heat-conducting shoulder element. Soldering-tip retaining means are provided to hold the tip in heat-conducting relationship with the heating element and the temperature-sensing element. A heater-element power source is provided with a power rating which exceeds the rating of the heater element by a preselected amount to obtain in cooperation with a temperature control circuit a quickly responding temperature-regulated soldering tool. In the drawings:

FIG. 1 is a simplified partial sectional view of a soldering iron combined with a schematic diagram of the electrical circuitry employed to temperature control the soldering iron; and FIG. 2 is an enlarged fragmentary sectional view of parts mechanically cooperating at the tip of the soldering iron; and FIG. 2 is an enlarged fragmentary sectional view of parts mechanically cooperating at the tip of the soldering iron of FIG. 1.

In FIG. 1, I show a soldering iron 10 and a control network 11. The soldering iron is composed of a conventional heat-insulated handle 12 sized for convenient manual gripping thereof and a heater assembly 14 attached to the handle. The heater assembly 14 comprises a flanged cylindrical collar 16 attached by screws 18 to the handle 12. The collar 16 is provided at a radially outer surface with a screw thread 20 for engagement with screw thread on a nut 22. The collar 16 is provided with suitable apertures 24 for the passage of temperature-sensing element leads 26 and heater-element leads 28. The collar has a bore 30 for receiving a temperature-sensing element assembly 32 and a cylindrically shaped heater element 34. The nut 22 has a radially inwardly extending shoulder 36 sized to engage the base flange of a soldering-tip holder 38.

The heater element 34 is formed of a pair of concentrically mounted thin-walled stainless-steel tubes 40–40' which are sized to form an annular clearance 42 between them. A bore 43 extends throughout the inner tube 40'. Within the clearance 42 at one end of the stainless-steel tubes 40–40' is mounted a cylindrical heater coil 44 which is in heat-conducting relationship with the thin walled stainless steel tubes. Wires 28 provide power to the heating coil and are shown passing through the annular clearance 42 toward the handle 12, for electrical connection to the control network 11. The coil 44 is suitably held, as by crimping at the axial ends of tubes 40–40' and adjacent the coil 44, to prevent heater-coil displacement and to add rigidity to the thin-walled structure.

The temperature-sensing element assembly 32 comprises a heat-conducting tube 46 and a temperature-sensing element 48 such as a thermistor, shown as of the bead variety and mounted within the tube 46 and in an electrically insulating material 50 such as a ceramic cement capable of sustaining high soldering-iron temperatures; the tube 46 may be thin-walled stainless steel, the cement 50 is preferably one of the low-expansion heat-conducting varieties, such as the zirconium-base No. 29 cement of Sauer-Eisen Cements Co. which is capable of withstanding temperatures well beyond the range of use of the soldering iron. The temperature-sensing element 48 is located near one end of the tube 46, and the tube 46 in turn is mounted concentrically with the heater element 34 within an insulative material 50' which partially fills the bore 43 of the heater element 34. The insulative materials 50–50' may both be ceramic cements. The temperature-sensing element is preferably located as close as possible to the wall of the tube 46 but yet with a sufficient amount of material 50 therebetween to electrically isolate the thermistor 48. With the temperature-sensing element assembly as described, an annular shaped bore 52 is formed, with the heater element 34 at the radially outer edge and the tube 46 forming the radially inner boundary. Wires 26 make electrical contact with the temperature-sensing element 48 and pass through the insulative materials 50–50'.

A soldering tip 54 is shown as a single piece or part having a conically shaped soldering end 56 and a heat-conducting shoulder 58. The soldering end 56 has a flat end surface for soldering as is conventional in the art. The heat-conducting shoulder portion 58 of the soldering tip 54 is provided with a bore 60 sized to accomplish ready heat-transfer by direct contact with the tube 46 and may be so sized in depth that the bottom of the tip bore 60 seats on the end of the tube 46; alternatively, the size and selection of materials for tube 46 and shouldered portion 58 may be such as to allow axial insertion when cold (i.e., room temperature) and to achieve direct circumferentially continuous cylindrical contact with the bore 60 under heated (i.e., iron-operating) temperature conditions. Note that with this arrangement the sensing element is separated from the heater coil by the soldering-tip shoulder portion 58. The heat-conducting shoulder portion 58 of the tip has sufficient thickness and the operating fit of the parts is such that heat-transfer is direct and immediate, so that temperatures sensed by the element 48 are essentially also the temperature of the soldering surface 56 of the tip.

To ensure that direct heat-conducting contact is made between the soldering tip and the tube, the bottom 62 of the bore 60 may be conically shaped at 63 to establish an annular, forwardly located heat-conducting contact between the tip 54 and the tube 46. As shown in the drawing, the tip is freely movable into engagement between the heater element 34 and the tube 46 and is therefore retained by tip holder 38. The tip holder 38 is tubular shaped and is provided at one end with an inwardly extending annular shoulder 64 having an opening which fits over the conical portion of the tip 54 to seat on the shoulder 66 of the tip. The other end of the tip holder is provided with radially outwardly extending shoulder or base flange 67 which seats the shoulder 36 on nut 22. As rotation of the nut 22 draws the tip holder 38 towards the handle 12, a firm seating and engagement of the tip 54 on the tube 46 is assured. Removal of the tip merely requires a rotation of the nut.

Alternatively, and preferably, prime reliance on good heat-transfer between the work-contact tip region 56 and the bead 48 is placed on the circumferential direct contact alluded to above. I have achieved excellent and rapid thermistor-tracking of work-contact temperatures at 56 by employing a copper tip 54 in which cold radial clearances, between tube 46 and bore 60, and between shouldered element 58 and the bore of tube 40', are each in the order of 1 mil, and with an axial clearance in the order of 5 mils between tube 46 and the bottom 63 of the bore 60. In operation, i.e., when heated, these small radial clearances close to accomplish an extensive area of direct heat-transmitting contact, as will be understood. The effectiveness of the heat-transmitting contact has been found to be such that, after use, the tip 54 cannot be removed from its bore-engagement to tube 46 without destroying tube 46 or dislodging its rooting or anchorage in the cement 50'; however, when the parts approach room temperature, the described small clearances redevelop, and telescoping disassembly is readily achieved, as for tip-replacement purposes.

In the selection of a suitable electrical control network 11 for the soldering iron, a prime consideration is its power-controlling capability. A main feature of the invention involves the employment of a source of power which exceeds the rating of the heating element 34 by a preselected amount. In this manner, a fast response of the soldering iron may be obtained as well as a proper temperature control even with high loads placed on the iron. Typically, if a soldering iron is rated at 24 volts, 60 watts, the power supplied to the heating element is at 35 volts, for a total of about 90 watts. Thus, approximately 50 percent more power than the rating of the soldering iron is applied and care must be taken to ensure that the heating element will not burn out.

The power supplied to the soldering iron is by means of a zero-voltage switching circuit, which turns on the power when the sine wave goes through zero and turns it off at zero voltage, thereby applying only sine-wave power to the soldering iron. This eliminates any possibility of RF interference which pulse modulating the power would cause. An electrical circuit which accomplishes this objective is shown in network 11. Network 11 includes a bridge circuit operatively coupled to a differential amplifier, both located at 70; a zero line voltage-sensing circuit 72 and a power-switch circuit 74.

An AC line voltage is applied through a stepdown transformer 76 to supply an AC voltage at 35 volts. A capacitor 78 is connected to one end of the secondary of the transformer 76 for partially filtering the AC supply and providing the DC voltage necessary for driving the control circuitry. The control circuitry includes a resistance bridge connected to a differential amplifier network composed of a pair of differentially connected transistors 80-82. The four bridge legs comprise, in the first leg, a calibrating variable resistor 84 and the thermistor sensing element 48 mounted in the tube 46. A second leg of the bridge is composed of a temperature-adjusting potentiometer 86 in series with a current-limiting resistor 88 and the third and fourth legs of the bridge are formed by balance resistors 90 and 92 respectively and which are connected at their common junction to the base 94 of transistor 82. The second bridge leg, in the context of connection to the other bridge legs, establishes a reference-signal source, of value adjustably predetermined at 86, in reference to which the temperature-varying signal in the first leg is determinative of a cycling operation, for control of power supplied to the heating element 44. A capacitor 96 is connected from the collector of the transistor 82 to the base 98 of the transistor 80 to provide the cycling operation, the advantage of which will be explained.

The collector of transistor 80 is coupled to a zero crossing detector 72 which produces an output pulse to the base of transistor 100 to assure that the semiconductor switch 74 placed in series between the AC line and the heater element 34 is turned on at the time the line crosses zero voltage. The transistor 100 controls a pair of parallel connected transistors 102-104 to assure sufficient drive for the semiconductor switch 74. A typical semiconductor switch suitable for the purposes of this control may be a Triac or bidirectional thyristor. The heater leads 28 are connected to the network 11 as shown in the schematic. A lamp 106 in series with a current-limiting resistor 108 is placed directly across the heater elements in order to provide a display of the length of time that power is supplied to the heater element.

The metal parts of the soldering iron are grounded through a three-wire grounded plug line cord 110 to earth ground for safety. For this purpose, a grounding strip 114 is provided which makes contact with the collar 16 by placement in a suitable recess provided therefor in the handle 12 and is retained to the handle by a screw 18. The AC power lead 28' is therefore coupled to ground at the soldering iron. This ground connection assures that the control network 11 will not be disturbed by undesirable ground currents from the AC source.

As previously mentioned, the capacitor 96 provides an oscillating or flashing operation of the control. The rate of flashing is a function of the time constant established by the capacitor 96 and the resistances in the first and second legs of the bridge. If the resistances are equal in these two bridge legs, then the on-off ratio of the flashing will be unity, and any offset in the balance of the bridge will produce a greater or lesser duty factor.

In the operation of the control circuitry of the figure with the bridge in balance, all output from the control circuit is inhibited. Thus, transistor 80 is conducting and transistor 82 is off. Since transistor 80 is on, transistor 100 which is controlled by network 72 is also on, thereby preventing an enabling signal to the switch 74. Thus, the thyristor 74 is cut off, and no power is applied to the heating element 34. As the temperature of the tip 54 decreases due to the application of the soldering iron to a load, the resistance of the thermistor increases, causing an imbalance of the output to the bridge, enabling the differential connected transistors 80-82 in a manner whereby transistor 82 is rendered conducting, transistor 80 is cut off, switch 74 is closed i.e., conductive) and full power is applied to the heating element 34. As soon as the tip 54 is brought back to the proper temperature and the bridge is balanced again, the thyristor is rendered nonconducting. When power is first applied to the circuit, the lamp 106 will glow steadily, indicating that power is being applied continuously to the heating element 34. However, when the resistance of the thermistor has decreased to the point where the input into the bridge is in balance again, power is turned off and the lamp goes out; thus, the switching action is such as to supply intermittent overload-power bursts of sine-wave (AC) energy to the heating element, with a duty cycle which reflects instantaneous needs. Because of the fact that 50 percent in excess of the rated power is employed and applied to the heating element, the iron heats up very fast, generally less than 30 seconds from ambient temperature to the desired temperature.

The thermistor employed determines the operating range of the soldering iron. Preferably for this reason a thermistor which is capable of operating from about 540° F. to 680° F. is used. This temperature range will cover about 90 percent of the soldering applications and thus is quite suitable for the soldering iron in accordance with the invention. Higher temperature operation thermistors may be employed and, in fact, in some applications thermocouples may be found quite useful. The ability to control the desired temperature setting with the resistor 86 greatly enhances the utility of the soldering iron. One may solder heat-sensitive semiconductor circuitry without damage thereto and with excellent temperature control. The soldering iron according to my invention permits the quite close control of the temperature of the tip both during load and no-load conditions. For instance, within the range from 540° to 680° F., my soldering iron was found to control the tip temperature within −5° to +20° F. even under heavy soldering loads. Thus, large temperature variations of the soldering tip are avoided and an efficient electrical circuit-building tool is obtained.

While the principles of the invention have been described in connection with specific apparatus, it is to be clearly understood that this description is made only by way of example and not as a limitation to the scope of the invention as set forth in the objects thereof and in the accompanying claims.

What is claimed is;

1. A temperature-controlled soldering iron, comprising annular heating means with a cylindrical bore and an electrical heating element surrounding said bore, a cylindrical heat-detector enclosure containing a heat-detector element and means radially supporting the same in rigid radially heat-transmitting relation within said enclosure, means rigidly supporting said enclosure at one end with the other end projecting concentrically within and radially spaced from the bore of said heating means, whereby a cylindrical annular space open at said other end is defined between said bore and said enclosure, and a soldering tip of heat-conducting material including a work-applicator end and a support end, said support end being axially elongated and cylindrically annular and telescopically enterable into said annular space, adjacent telescopically overlapped cylindrical surfaces of said tip and heating means and enclosure being in direct heat-conducting contact when heated, and supply means including an electrical-supply connection to said heating element and a control connection from said heat-detector element, said rigid supporting means including means thermally insulating a first radial path between said heating means and said enclosure at said one end to an extent such that a direct-contacting second path at said other end via the inserted support end of said tip constitutes substantially a thermal short circuit of said first path, whereby said heat-detector element inherently responds essentially only to the instantaneous heated condition of said tip.

2. A soldering iron according to claim 1, in which the bore of said heating means comprises a continuous cylindrical relatively thin tube of heat-conducting material and in which said detector enclosure comprises a continuous cylindrical relatively thin tube of heat-conducting material, whereby in operation said tip is thermally related to both said heating element and said detector element via adjacent pairs of directly contacting relatively thin cylindrical tube of heat-conducting material, whereby in operation said tip is thermally related to both said heating element and said detector element via adjacent pairs of directly contacting relatively thin cylindrical tubes of heat-conducting material.

3. A soldering iron according to claim 2, in which said tubes are of relatively thin stainless steel and in which the annulus of said support end is relatively thick and includes copper as the substantial component.

4. A soldering iron according to claim 1, in which said heat-detector element is rigidly supported in said enclosure by a solid potting of heat-transmitting ceramic material.

5. A soldering iron according to claim 4, in which said heat-detector element is a bead thermistor located near said other end of said enclosure.

6. A soldering iron according to claim 1, in which the thermal-expansion characteristics and sizing of said telescoped tip and heating means and enclosure are such that at room temperature a clearance exists therebetween to enable ready axial removal or replacement of a soldering tip.

7. A soldering iron according to claim 1, in which the heating element has a preselected maximum-voltage rating, means providing a source of electrical energy having a maximum-voltage rating substantially exceeding that of the heating element, and electronic-switch means including a predetermined reference-signal source and means responsive to instantaneous temperature-varying signals from the sensing element for periodically connecting and disconnecting the source-providing means with respect to the heating element, said electronic-switch means providing a continuous succession of overload-voltage bursts of electrical energy to said heating element, with a duty cycle reflecting instantaneously sensed tip temperature, referenced to the predetermined value of the reference-signal source.

8. A temperature-controlled soldering iron comprising a heat-insulated handle, a tubular heating element having one end attached to the handle and having an elongated bore open away from the handle-secured end, a soldering tip having a working-tip body and a heat-conducting shoulder portion sized to fit within and in radial adjacency to the heating element bore by axial insertion at the open end, said tip heat-conducting shoulder portion having an element-receiving bore in axial overlap with the heater-fitted part of said shoulder portion and of preselected depth, a heat-sensing element including elongated cylindrical mounting means supporting said heat-sensing element near one end, supporting means rigidly securing the other end of said mounting means to said handle, said one end of said mounting means being sized to fit within and in radial adjacency to the shoulder bore and in proximity with said tip body upon axial insertion, and selectively operable means for retaining said tip in axially removable relationship with the heating element and with said heat-sensing element; said rigid supporting means including means thermally insulating a first radial path between said heating means and said mounting means at the handle-supported end thereof to an extend such that a second path at the sensing-element end thereof, via the inserted shoulder portion of said tip, constitutes substantially a thermal short circuit of said first path, whereby said heat-detector element inherently responds essentially only to the instantaneous heated condition of said tip.

9. The soldering iron as recited in claim 8, wherein the heating element is selected with a preselected maximum-voltage rating of the heating element, and electronic-switch means including a predetermined reference-signal source and means responsive to instantaneous temperature varying signals from the sensing element for periodically connecting and disconnecting the source-providing means with respect to the heating element, said electronic-switch means providing a continuous succession of overload-voltage bursts of electrical energy to said heating element, with a duty cycle reflecting instantaneously sensed tip temperature, referenced to the predetermined value of the reference-signal source.

10. The soldering iron as recited in claim 8, wherein said heat-sensing element is located within and near the tip end of the bore of the mounting means, and mounting means having a length sufficient to seat the tip end of the mounting means on the bottom of the shoulder bore for direct-contact heat-conducting relationship therewith, the shoulder-portion bore and the mounting means being configured to establish an annular region of direct contact.

11. A soldering iron according to claim 9, in which the maximum-voltage rating of the source exceeds the voltage rating of the heating element to the extent of at least substantially 50 percent.

12. A soldering iron according to claim 9, in which said source means provides an AC supply, and in which said electronic-switch means includes zero line-voltage sensing means operative to initiate connection periods at substantially the instant of zero line-voltage.

13. A soldering iron according to claim 8, in which the sizing and materials of said shoulder portion and of said heating and heat-sensing elements are so selected that, when said last-defined means is in its tip-retaining position and at least when said iron is heated, there is substantially direct radial contact and heat conduction between said shoulder portion and said heating and heat-sensing elements.

* * * * *

UNITED STATES PATENT OFFICE
CERTIFICATE OF CORRECTION

Patent No. 3,646,577    Dated February 29, 1972

Inventor(s) Frank Ernst

It is certified that error appears in the above-identified patent and that said Letters Patent are hereby corrected as shown below:

Column 5, line 55, insert a hyphen between "short" and "circuit".
Column 5, line 62, cancel "whereby in"
Column 5, line 63, cancel "operation said tip is thermally related to both said heating ele-"
Column 5, line 64, cancel "ment and said detector element via adjacent pairs of directly"
Column 5, line 65, cancel "contacting relatively thin cylindrical tube of heat-conducting"
Column 5, line 66, cancel "material,".
Column 6, line 51, insert a hyphen between "short" and "circuit".
Column 6, line 55, after "voltage" insert the following -- rating, means providing a source of electrical energy having a maximum-voltage rating substantially exceeding the voltage --.
Column 6, line 68, "and" should be -- said --.

Signed and sealed this 25th day of July 1972.

(SEAL)
Attest:

EDWARD M. FLETCHER, JR.         ROBERT GOTTSCHALK
Attesting Officer               Commissioner of Patents